B. M. MOOERS AND L. E. WARNER.
CIRCUIT BREAKER.
APPLICATION FILED SEPT. 19, 1917.
1,414,659.
Patented May 2, 1922.
2 SHEETS—SHEET 1.
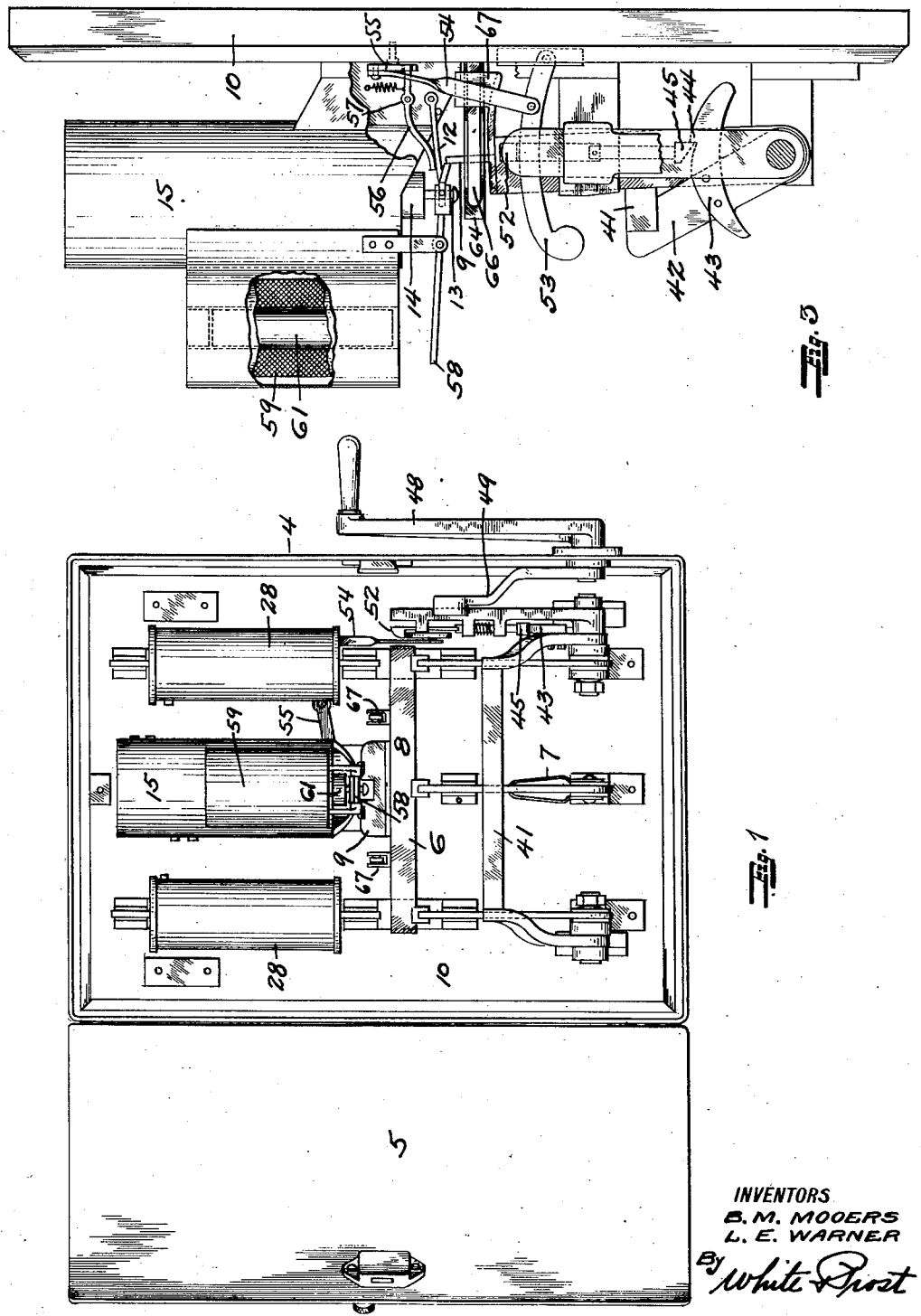
INVENTORS
B. M. MOOERS
L. E. WARNER
By White & Prost
ATTORNEYS

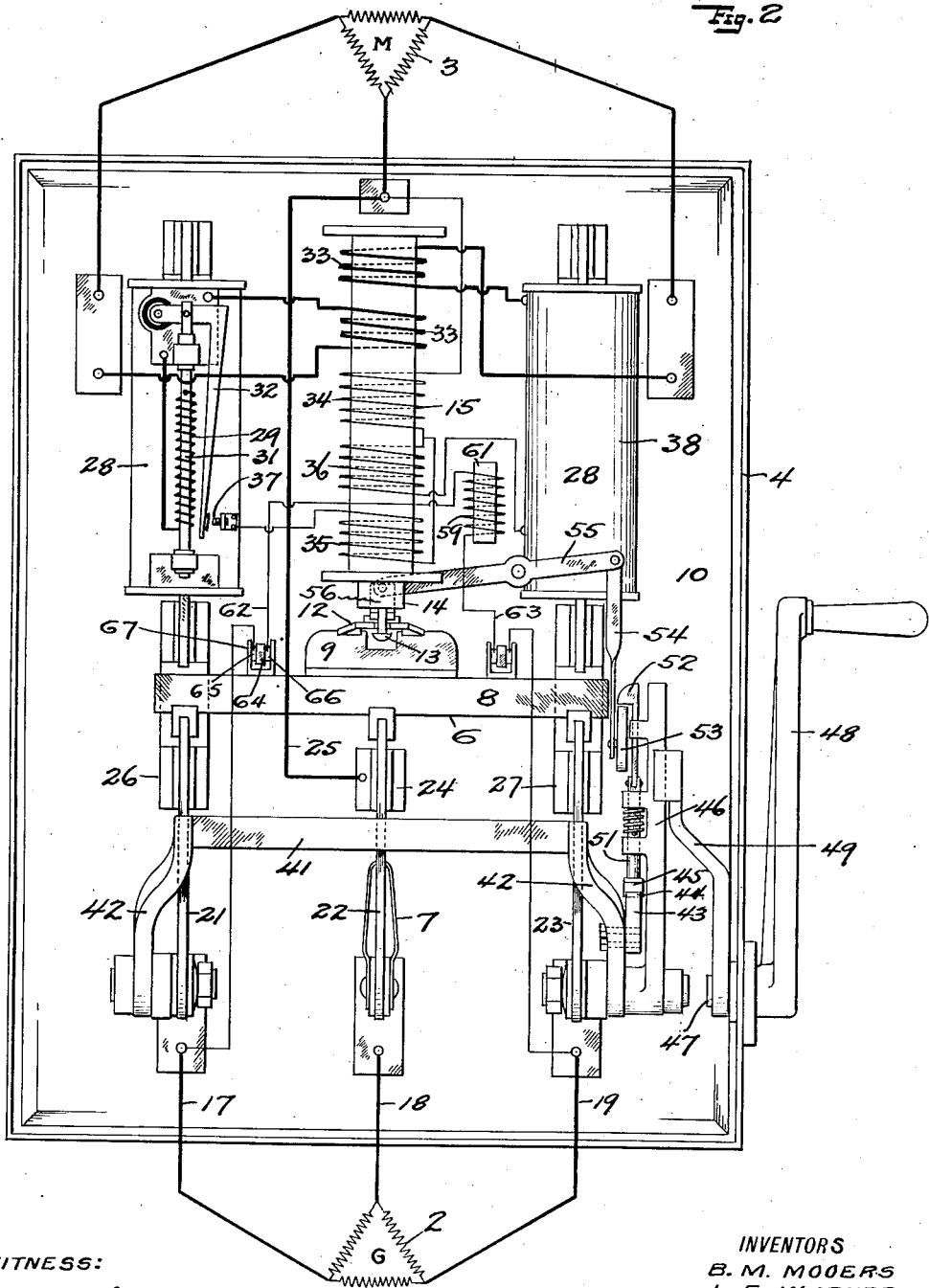

UNITED STATES PATENT OFFICE.

BENJAMIN M. MOOERS, OF SAN FRANCISCO, AND LAWRENCE E. WARNER, OF BERKELEY, CALIFORNIA, ASSIGNORS TO MOTOR PROTECTOR MANUFACTURING COMPANY, OF SAN FRANCISCO, CALIFORNIA, A CORPORATION OF CALIFORNIA.

CIRCUIT BREAKER.

1,414,659.  Specification of Letters Patent.  Patented May 2, 1922.

Application filed September 19, 1917. Serial No. 192,199.

*To all whom it may concern:*

Be it known that we, BENJAMIN M. MOOERS and LAWRENCE E. WARNER, citizens of the United States, and residents, respectively, of the city and county of San Francisco, and of Berkeley, Alameda County, both in the State of California, have invented a certain new and useful Circuit Breaker, of which the following is a specification.

The invention relates to circuit breakers which operate to open the electric circuit when the current or voltage therein approaches critical values.

An object of the invention is to provide an apparatus which operates to open an electric circuit containing electrical apparatus, when the temperature of such apparatus, or certain portions thereof, approaches a dangerous value.

Another object of the invention is to provide means for preventing an operator from holding the circuit closed when such dangerous temperature values obtain in the apparatus.

Another object of the invention is to provide means for opening the circuit when the voltage therein drops to a predetermined value.

A further object of the invention is to provide means for immediately opening the circuit, when abnormal overloads, such as occur upon short-circuiting, are placed thereon.

A further object of the invention is to provide an enclosed, self-contained apparatus for the stated purposes, in which the circuit is closed by an external handle which is automatically disconnected from the switch when high temperature values obtain in the electrical apparatus.

The invention possesses other advantageous features, some of which, with the foregoing, will be set forth at length in the following description where we shall outline in full that form of the invention which we have selected for illustration in the drawings accompanying and forming part of the present specification. In said drawings we have shown one specific embodiment of our generic invention, but it is to be understood that the invention as expressed in the claims may be embodied in a plurality of forms. In the drawings we have shown the invention as applied to an air switch, but it is to be understood that it is applicable with equal efficiency to a switch in which the switch contacts are immersed in oil.

Referring to said drawings:

Figure 1 is a front view of the apparatus of our invention.

Fig. 2 is a diagrammatic representation of the apparatus.

Fig. 3 is a side elevation of the apparatus, parts thereof being broken away to disclose the construction.

Devices have heretofore been employed for releasing or opening a switch in an electric circuit containing electric apparatus, when the temperature of the apparatus or a portion thereof reached a predetermined maximum, thereby preventing destruction of the apparatus or the windings thereof by abnormal temperatures. Frequently, however, after the switches have been opened, operators have closed them before the apparatus has cooled and have forcibly held the switches in, so that the protective apparatus could not operate and have thereby caused the apparatus or the windings thereof to burn out. An object of our invention, therefore, is to provide means which prevents the switch from being held closed until the temperature of the apparatus or a part thereof has dropped to such lower value that it will not be deleteriously affected by the closing of the circuit.

The protective apparatus of this invention is usually arranged on a switch board or at some other point remote from the apparatus being protected and is preferably so constructed that its temperature varies directly with the temperature of a selected portion of the protected apparatus, or that part of a conductor in an apparatus which has the least heat emissivity. The protective device is arranged in the circuit connected to the electrical apparatus and includes a conductor which is preferably arranged in series in the circuit, and the heating conductor is heat-insulated in substantially the same degree as those conductors in the electrical apparatus which have the least heat emissivity, so that the temperature of the device always corresponds to the high temperature which exists in the apparatus. When a temperature is reached in the protective device which corresponds to an abnormal or destructive temperature within the apparatus, the device operates to open the circuit.

In the drawings we have shown the invention as applied to protecting a three-phase motor, but it is to be understood that the invention is applicable to direct current or to alternating current of one or more phases. Current is derived from the alternating current generator 2 and is supplied to the alternating current motor 3, which is protected against overheating by the system of our invention. The circuit breaker is arranged in a case or box 4, preferably made of metal, which is provided with a door 5 which is locked to prevent access to the switch. A three-blade switch 6 is arranged in the circuit, the blades being insulated from each other, and the switch is provided with a spring 7 which operates to open the switch. The blades are connected together by the insulating cross bar 8, to which is secured an ear 9, which is engaged by the pivoted latch 12, to hold the switch closed. The latch 12 is hinged at its rear end to the switch panel 10 and when raised, releases the cross bar and allows the switch to spring open. Engaging the latch 12 is a pin 13 secured to the core 14 of the solenoid 15, so that when the solenoid is energized the latch is raised and the switch flies open. The three supply leads 17, 18, 19 are connected to the pivot supports of the three blades 21, 22, 23, and the contact clip 24 of the central blade is connected directly to the motor 3 by the conductor 25. The contact clips 26 and 27 of the blades 21 and 23 are connected to the motor through the temperature-operated relays 28. The relay comprises a coiled conductor 29 in thermal communication with a thermostatic element, which in the present instance comprises a metallic rod 31 around which the conductor 29, duly insulated, is wrapped and to which it is connected at its end. The lower end of the rod 31 is fixed and is connected to the clip 26 and the upper end is pivoted to a lever 32 which is moved by variations in the length of the rod, due to temperature changes. The conductor 29 is connected to the motor 3, preferably through a coil 33 forming part of the solenoid, so that a great excess of current will energize the solenoid sufficiently to trip the switch. The solenoid is provided with a three-phase winding 34, 35, 36, so arranged that two of the windings are always brought into operation to raise the plunger 14. The lever 32 is arranged to engage a contact 37 which is connected to the coil 35 of the solenoid, so that when the current is closed at contact 37, coils 35 and 34 of the solenoid are energized and the plunger is raised and the switch released, opening the circuit. As soon as the switch opens, the solenoid circuit is broken and the latch 12 drops back into position to again receive the switch. The thermal relay 28 is enclosed in a casing 38 of heat-insulating material, so that the temperature of the conductor 29 therein corresponds directly with the temperature of the hottest part of the windings in the motor 3 and the relay is so arranged that it operates to close the contact 32—37 when a certain maximum temperature obtains in the hottest part of the motor winding.

Means are provided for closing the switch from the exterior of the case and for releasing the closing means from the switch when an effort is made to close the switch during the period of high temperature of the motor, and consequently of the relay. Bearing against the rear side of the switch blades is a cross bar 41 of insulating material, which is mounted on arms 42 pivoted concentrically with the switch blades. Secured to one of said arms 42 is a curved bar or quadrant 43 having a notch 44 therein which is engaged by a spring-pressed latch 45, which is secured to and slidable longitudinally on the arm 46 pivoted concentrically with the switch blades. Journaled in the side wall of the case is a shaft 47, having a handle 48 secured to its outer end and an arm 49, engaging arm 46, secured thereto at its inner end. With the latch 45 engaging the notch on the quadrant 43, the handle 48 is connected to the arm 42, so that an upward movement of the handle moves the switch blades to closed position.

Means are provided for lifting the latch 45 out of the notch on the quadrant, when an effort is made to close the switch during the time that the high temperature obtains in the motor or during the time that lever 32 is in engagement with the contact 37. Pivoted to the stem 51 of the latch 45 is a shoe 52 which overlies the curved trip 53 which is pivoted to the panel. The curvature of the trip is such that when it is in normal position, its surface is concentric with the pivot of arm 46, so that normally the shoe is not engaged by the trip. The trip is connected to the latch 12 by the link 54, lever 55 pivoted to the panel and lever 56 pivoted at 57. The outer end of the lever 56 bears against the latch 12, so that when the latch 12 is raised, the trip 53 is raised, disconnecting the handle 48 from the arms 42. With the switch automatically disengaged due to a rise in temperature of the motor, should an attempt be made to again close the switch before the motor has cooled, the closing of the switch by the handle will immediately operate the solenoid to raise the trip and release the switch from the handle, so that the switch cannot be held closed.

Means are also provided for opening the circuit, should the line voltage reach a predetermined minimum value and for preventing the switch from being closed while such low voltage obtains. Engaging the outer end of the latch 12 is a lever 58, the free end of which lies below the low voltage solenoid 59 which is connected across one of the phases. A core 61 in the solenoid is released when the voltage reaches a predetermined low value, and drops onto the lever 58, raising the latch 12, and releasing the switch. The core holds the latch raised, consequently holding the trip raised, so that in the closing movement of the switch the latch 45 is lifted out of the notch in the quadrant before the switch reaches its closed position, thereby releasing the handle from the switch. The voltage leads 62—63 of the solenoid 59 are provided with contacts which are broken as the switch flies open, so that the coil is not energized when the switch is open. Secured to the panel and extending forward over the cross bar 8, is a bar of insulating material 64, having metallic contact strips 65—66 on opposite sides thereof, the strips being connected to the coil 59 and to the line side of the switch respectively. Mounted on the cross bar 8 is a clip 67 arranged to engage the strips 65—66 as the switch is closed, to complete the circuit through the low voltage coil. The strips are of such length that the circuit through the low voltage coil is made before the switch closes, so that should there be normal voltage on the line, the core 61 will be raised by the solenoid 59 to allow the latch 12 to drop into position to engage the ear 9, before the switch reaches its closed position.

We have described our invention as applied to an air switch controlling the circuit of a motor, but it is to be understood that the invention is applicable to other types of switches and to other electrical apparatus in which abnormal temperatures are deleterious to the apparatus or parts thereof.

We claim:

1. A protective device for an electric circuit containing electrical apparatus, comprising a switch, means operative by an increase in temperature of the apparatus for releasing the switch, a handle for closing the switch and means operative by the temperature controlled means for releasing the handle from the switch.

2. A protective device for an electric circuit containing electrical apparatus, comprising a switch, a spring opposing the closing movement of the switch, a handle for closing said switch, and means operative during the presence of a high temperature in the apparatus for releasing the handle from the switch when the switch is moved to closed position.

3. A protective device for an electric circuit containing electrical apparatus, comprising a switch, a spring opposing the closing movement of the switch, a handle for closing said switch, a latch for holding the switch in closed position and means operative during the presence of a high temperature in the apparatus for raising the latch and releasing the handle from the switch when the switch is moved to closed position.

4. A protective device for an electric circuit containing electrical apparatus, comprising a switch, a handle for closing the switch, a latch for holding the switch in closed position and means operative by the heating effect of the current in the circuit for releasing the latch and releasing the handle from the switch when the switch is moved toward closed position.

5. A protective device for an electric circuit containing electrical apparatus having a current-carrying winding, comprising a switch, a handle for closing said switch, and an element associated with said circuit which is influenced by the current traversing said winding and responsive to the temperature obtaining in said winding for releasing said switch, and means controlled by said element for releasing the handle from the switch.

6. A protective device for an electric circuit containing electric apparatus, comprising a spring-pressed switch in said circuit, a latch for holding the switch in the closed position, a solenoid, a core in said solenoid operatively connected to said latch, means operative by an increase in temperature of the apparatus for energizing said solenoid, whereby the switch is released, a handle for closing said switch, and means having a temperature corresponding directly to the temperature of the apparatus for releasing the switch from said handle.

7. A protective device for an electric circuit containing electric apparatus, comprising a switch in said circuit, means for opening the switch, a handle for closing said switch and means having a temperature corresponding directly to the temperature of the apparatus for releasing the handle from the switch when the switch is moved toward closed position.

8. A protective device for electric circuits containing electrical apparatus, comprising a switch in said circuit, means for opening said switch, a handle for closing said switch and means controlled by the voltage in the circuit and the temperature of the apparatus for releasing the handle from the switch.

9. A protective device for electric circuits containing electric apparatus, comprising a switch in said circuit, means operative by an increase in temperature of the apparatus for opening the switch, means operative by a reduction of voltage in the circuit for opening the switch, a handle for closing the switch and means associated with said voltage operative means and said temperature operative means for releasing the handle from the switch.

In testimony whereof, we have hereunto set our hands at San Francisco, California, this 6th day of September, 1917.

BENJAMIN M. MOOERS.
LAWRENCE E. WARNER.

In presence of—
H. G PROST.